United States Patent
Chou et al.

(10) Patent No.: US 11,651,495 B2
(45) Date of Patent: May 16, 2023

(54) METHOD AND SYSTEM FOR IMAGE CORRECTION

(71) Applicant: REALTEK SEMICONDUCTOR CORP., Hsinchu (TW)

(72) Inventors: Yang-Ting Chou, Tainan (TW); Tsung-Hsuan Li, Hsinchu (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 198 days.

(21) Appl. No.: 17/123,228

(22) Filed: Dec. 16, 2020

(65) Prior Publication Data
US 2021/0192742 A1    Jun. 24, 2021

(30) Foreign Application Priority Data
Dec. 18, 2019  (TW) .................. 108146380

(51) Int. Cl.
*G06T 5/00* (2006.01)
*G06T 5/20* (2006.01)
(Continued)

(52) U.S. Cl.
CPC .............. *G06T 7/11* (2017.01); *G06T 5/008* (2013.01); *G06T 5/20* (2013.01); *G06T 7/0002* (2013.01);
(Continued)

(58) Field of Classification Search
CPC ......... G06T 5/008; G06T 5/20; G06T 7/0002; G06T 7/11; G06T 7/90; G06T 2207/10024; G06T 2207/30168
See application file for complete search history.

(56) References Cited

U.S. PATENT DOCUMENTS

| 10,812,733 B2 | 10/2020 | Sun | |
|---|---|---|---|
| 2009/0290052 A1* | 11/2009 | Liu | H04N 25/134 348/E9.002 |
| 2019/0318451 A1* | 10/2019 | Swami | G06T 3/4015 |

FOREIGN PATENT DOCUMENTS

| CN | 104581105 A | 4/2015 |
|---|---|---|
| CN | 106851121 A | 6/2017 |

(Continued)

OTHER PUBLICATIONS

Gunturk et al. ("Demosaicking: Color Filter Array Interpolation," IEEE Signal Processing Magazine, vol. 22, Issue 1, Jan. 2005) (Year: 2005).*

*Primary Examiner* — Yubin Hung
(74) *Attorney, Agent, or Firm* — Li & Cai Intellectual Property (USA) Office

(57) ABSTRACT

A method and a system for image correction are provided. The system includes an image processor that performs the method for image correction when receiving an input image. In the method, an overexposed area within the image is determined. The channel values of pixels in the overexposed area are applied with corresponding weights. An automatic white balance process is performed on the channel values of pixels in the overexposed area according to an expectation of low saturation in the overexposed area. Besides a first channel value of each of the pixels, a second channel value and a third channel value of the pixel can be estimated according to the channel values of periphery pixels. A correction value overexposed of the first channel value of the current pixel can be calculated according to the corresponding weights of the pixels in the overexposed area.

20 Claims, 5 Drawing Sheets

(51) Int. Cl.
*G06T 7/00* (2017.01)
*G06T 7/11* (2017.01)
*G06T 7/90* (2017.01)

(52) U.S. Cl.
CPC ...... *G06T 7/90* (2017.01); *G06T 2207/10024* (2013.01); *G06T 2207/30168* (2013.01)

(56) References Cited

FOREIGN PATENT DOCUMENTS

| | | | | | |
|---|---|---|---|---|---|
| CN | 110232659 | A | * | 9/2019 | ............. G06T 5/009 |
| EP | 1241896 | A2 | * | 9/2002 | ........... A61B 1/0638 |
| EP | 1853071 | A1 | * | 11/2007 | ........... H04N 1/6058 |
| FR | 2919943 | A1 | * | 2/2009 | ........... G06T 3/4015 |

* cited by examiner

METHOD AND SYSTEM FOR IMAGE CORRECTION

CROSS-REFERENCE TO RELATED PATENT APPLICATION

This application claims the benefit of priority to Taiwan Patent Application No. 108146380, filed on Dec. 18, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a technology for processing an overexposed image, and in particular to a method for image correction that processes the overexposed image and reassigns weights to the channels for preventing color shift without processing the non-overexposed area for retaining details of the image, and a system thereof.

BACKGROUND OF THE DISCLOSURE

According to the conventional image processing technology, an image-processing pipeline includes a process of gain adjustment. In the pipeline, after the process of gain adjustment of an image, a clipping process is performed upon an overexposed area of the image for reducing a certain brightness value that exceeds a threshold. However, the clipping process may cause loss of some details near the overexposed area of the image through a color filter array (CFA). Therefore, conventional solutions such as tone mapping, high dynamic range (HDR) technology and the like have developed.

The HDR imaging technology is to reproduce an image with a greater dynamic range of luminosity by merging multiple photos that are taken with different exposure values at the same time. Therefore, HDR imaging can solve the issue associated with capturing an image under a circumstance of high contrast and uneven exposure. However, the HDR technology requires a special sensor with high cost, and a longer processing time for each of the images.

When designing an image signal processor (ISP), multiple functional modules with various gains are required to process the image.

FIG. 1 shows a conventional image-processing module. The image-processing module includes a lens-shading correction (LSC) module 101 and an automatic white balance (AWB) module 103. The optical characteristics of the lens may cause a center area of an image sensor to receive light that is stronger than lights received by surrounding areas of the image sensor, resulting in inconsistent brightness between the center area and the surrounding areas of the image taken. The lens-shading correction module 101 can solve the problem that the uneven light refraction of the lens results in shadows appearing around the lens. The automatic white balance module 103 can automatically determine suitable white-balance parameters according to the property of a received light. The gain adjustment applied to the modules can expand the precision of the image. The bits per pixel of the image can be used to indicate the precision of the image. After the treatment of the tone-mapping module 105, the image can be restored to its original precision by re-setting the brightness. If the process does not perform tone mapping, the overexposed area of the image may have color shift when the image returns to its original precision.

With the processes of lens-shading correction, automatic white balance and tone mapping as examples, the lens-shading correction process may easily result in the differences of dynamic range among the different areas since the different gains are applied to the areas according the distances of the areas from an image center. For example, when an input image has been processed with the lens-shading correction process, a smaller gain is applied to compensate the central portion of the image, but a greater gain is applied to the part away from the center.

If the automatic white balance process treats a green pixel as a target and increases gains for red and blue pixels, the ratio of green (G) becomes smaller and ratios of red (R) and blue (B) become greater as compared to their original ratio of red (R), green (G) and blue (B) colors (i.e., R:G:B=1:1:1) in the overexposed area. In other words, when the image returns to its original precision as processed with the tone-mapping process after the processes of lens-shading correction and automatic white balance, the largest value at the corner in the overexposed area may be regarded as a dynamic range. At the same time, the pixels of overexposed area near the center of the image are multiplied by an AWB gain so as to maintain a color ratio for the further tone mapping process. However, the above conventional measures result in color shift in the overexposed area due to the ratios among the red, green and blue colors of the image in the overexposed area being changed.

SUMMARY OF THE DISCLOSURE

The present disclosure is related to a method for image correction and a system for the same. The method is adapted to an image-processing process executed in the system. One of the objectives of the method is to correct the pixel values within an overexposed area of an image. The method can effectively prevent the phenomenon of color shift due to the processes of lens-shading correction and automatic white balance.

In the method for image correction, the overexposed area of an input image is firstly determined. Weights are then assigned to the pixels in the overexposed area according to channel values of the pixels. The channel value of a current pixel is set as a first channel value within a color space. Periphery pixels of the current pixel can have a second channel value and a third channel value. An automatic white balance process is performed on the channel value of each pixel in the overexposed area based on an assumption that the image saturation is lower in the overexposed area. The automatic white balance operation relies on a light property to automatically conduct gain adjustment for the current pixel according to ratios of the first channel value, the second channel value and the third channel value.

Afterwards, in the overexposed area, the second channel value and the third channel value of the current pixel can be estimated based on the second channel values and the third channel values of the periphery pixels of the current pixel, respectively. A correction value with respect to the first channel value of the current pixel can be calculated according to the weights for each of the pixels in the overexposed area and the requirement of a minimal variance between the channel values of the pixels in the overexposed area.

In one aspect of the disclosure, the overexposed area can be determined by using a brightness threshold to compare with each of the channel values of the pixels. The pixels with the channel values greater than the brightness threshold are determined as overexposed. In one further aspect, the pixels with low-frequency signals are determined as overexposed.

Further, the weights assigned to the first channel value, the second channel value and the third channel value of the pixels are determined by performing an interpolation method according to a channel value range between an upper limit and a lower limit. The pixel is not over exposed if the channel value of the pixel is smaller the lower limit, and the pixel is not treated by the overexposed image correction method. Therefore, the original image information can be maintained in relevant area.

According to one embodiment of the system, the system includes an image processor configured to receive and process an input image and generate an image for output. The system includes a memory configured to store the image data in a process and the processing parameters. The image processor performs processing steps for image correction upon the overexposed area of the input image.

In one still aspect, the image processor embodies several circuit-based or software-based modules such as a lens-shading correction module, an automatic white balance module, and a module for maintaining an image precision.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
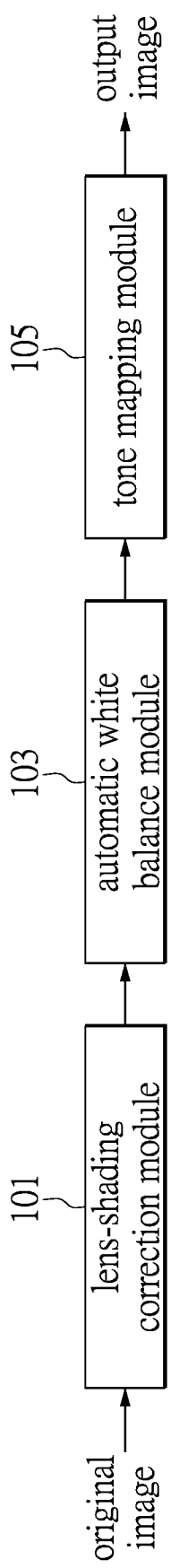
FIG. 1 is a schematic diagram depicting a conventional image processing module.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In a technology of image processing, an electronic device or a computer is provided for performing image processing. A software program or a firmware process is incorporated to an image signal processor (ISP) of the electronic device or the computer for performing image processing. Over-exposure is one of issues affecting the image quality during the image-processing process. In one aspect of the present disclosure, a brightness threshold is introduced to the image-processing process for determining at least one overexposed area of an image, and the at least one overexposed area can undergo a method for image correction. It should be noted that the overexposed area is formed by the pixels with brightness values exceeding the brightness threshold according to this aspect.

Some initial procedures in an image-processing process performed by an image processor or a related program may hide real values of the image. For example, the real values are such as the channel values of the image, and the channel values include a red (R) channel value, a green (G) channel value, and a blue (B) channel value. For example, the above-mentioned initial procedures may perform a clipping process to clip part of the overexposed area of the image. The clipping process is used to clip the brightness that exceeds the brightness threshold. The conventional clipping process is to clip the value that has been gained exceeding a specific pixel value (ex. 4095, 12 bit). Although the conventional clipping process can solve a problem of overexposed area, the image loses a dynamic range.

Thus, the real values of the image should be greater than the clipped values. Although the real values of the image during the conventional image-processing process is unobtainable, a reasonable estimation value can still be obtained based on a user's subjective expectation that the human eyes sense lower saturation from the overexposed pixels. Since the real values are not smaller than the current values, the variance among the channels, i.e., the red, green, and blue channels, can be minimized by increasing current values of overexposed channels (e.g., multiplied by a gain value). The adjustment lowers the saturation such that the saturation meets the user's subjective expectation with respect to the overexposed area. For non-overexposed pixels having brightness values lower than the brightness threshold of the image, their channels are not treated so that features of the non-overexposed pixels are retained, because the values of the non-overexposed pixels are reliable.

According to one embodiment of the method for image correction and the system, in view of understandings of the overexposed and non-overexposed areas, the method searches for the overexposed area overexposed before the overexposed channel values of the overexposed area are increased overexposed, e.g., multiplied by a gain value, and the method also reduces saturation of a specific area after a gain control.

Figure 2:
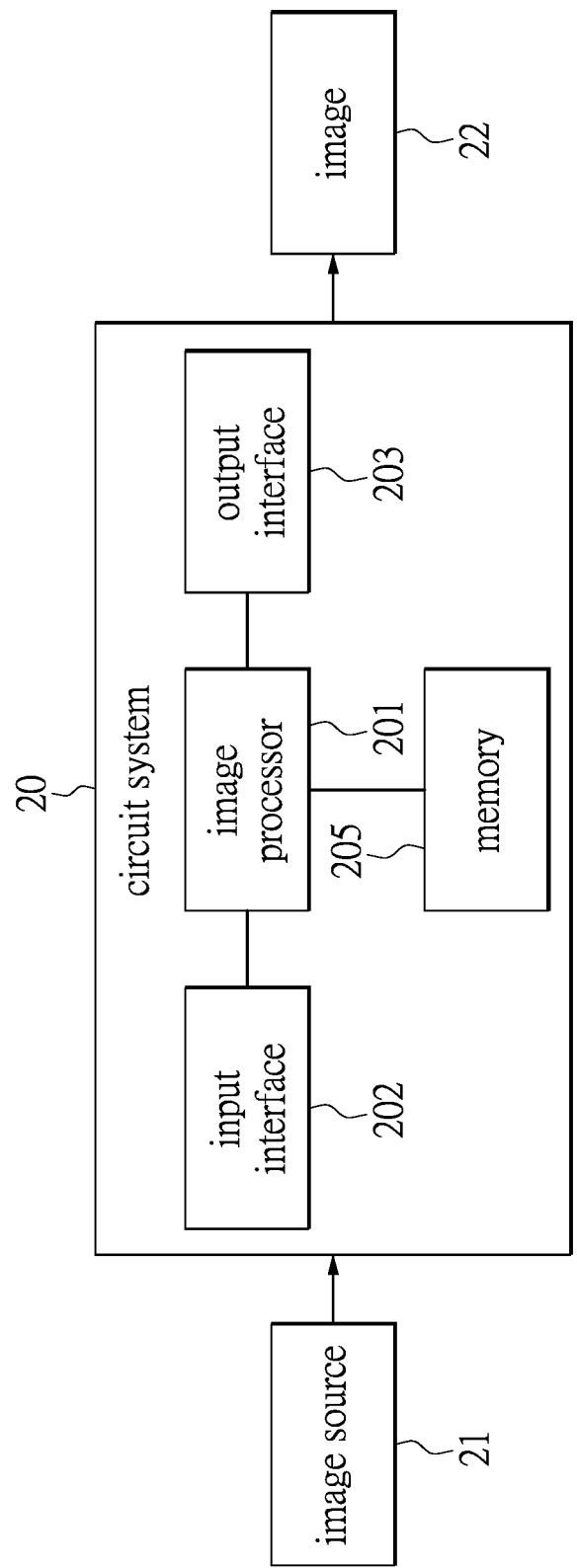
FIG. 2 is a schematic diagram depicting a system for performing overexposed image correction in one embodiment of the disclosure.

Reference is made to FIG. 1, which shows a schematic diagram depicting a framework for image processing method. FIG. 2 further shows a system 20 applying the framework for image processing. The system 20 includes an image processor 201 that can be an integrated circuit (IC) or a circuitry for image processing. The circuitry can be an ISP. The system 20 receives an input image from an image source 21 via an input interface 202. The image processor 201 includes a circuit or a software program for lens-shading correction (LSC), a circuit or a software program for automatic white balance (AWB), and a circuit or a software program for maintaining an image precision.

According to one of the embodiments of the disclosure, when receiving the input image, the image processor 201 uses processing parameters with respect to received image signals to perform a suitable image processing procedure. The image processing procedure is such as image sharpening, noise reduction or color space transformation. The image processing procedure can also include a lens-shading correction, automatic white balance and precision processing for the overexposed area. The precision can be used to denote a dynamic range of an image. A memory 205 of the system 20 is used to store image data in the procedure and the processing parameters provided for various image processing procedure. Afterwards, an image 22 is outputted via an output interface 203. The image 22 is a result of the method for image correction.

The method for image correction only processes pixels of the overexposed area that can be determined based on a specific threshold. The method does not process the pixels in the non-overexposed area for retaining the reliable image information. For example, a 12-bit image with pixel values 0 to 4095 has a phenomena of over exposure, and the channel values of the pixels near a center portion of the 12-bit image can exemplarily be "4088, 4080, 4080, 4088, 4088, 4080 . . . ", and the color channel values of the pixels away from the central portion of the image are overexposed and can exemplarily be "4088, 4080, 4080, 4088, 4080, 4080 . . . ." Pixels of different areas of the image are corrected by a lens-shading correction method, in which the color channel values at the different areas are multiplied by different gain values. For example, the channel values in the overexposed area near the central portion of the image are with less compensation may become "4583, 4551, 4526, 4567, 4551, 4526 . . . ", and the channel values in the overexposed area away from the central portion of the image are with greater compensation may become "6291, 6247, 7124, 6211, 6227, 7060 . . . ." Next, an automatic white balance (AWB) method is performed and the color channel values are multiplied by different gain values, e.g., R gain, G gain, and B gain, wherein the G gain=1 if the AWB is for G channel. Thus, the color channel values of the pixels near the central portion of the image become "4874, 4551, 7354, 6850, 4542, 7354 . . . ", and the color channel values of the pixels away from the central portion of the image are then processed with the automatic white balance method and become "9388, 6247, 11576, 9364, 6227, 11550 . . . ." Afterwards, a tone mapping method is used to process the image precision in which the gained image is compressed to its original precision. In an example of the present disclosure, the tone mapping method compresses the pixel with the highest value to the maximum (e.g., 4095 of a 12-bit image) of the original image, and other pixels are adjusted according to a specific ratio. The present example shows that the pixels near the central portion of the image encounter color shift. The channel values of the pixels near the central portion of the image are processed by the tone mapping method for demosaicing and the image is restored to be "4095, 3024, 4095, 4095, 3027, 4095 . . . ", and the channel values of the pixels away from the central portion of the image become "4095, 4038, 4095, 4095, 4034, 4095 . . . ."

The image processor 201 performs the method for image correction upon the pixels in an overexposed area. The overexposed area can be determined based on, but not limited to, the pixel values or the low-frequency signals of the current pixel.

The main concept of the overexposed image correction method is to utilize a threshold to set up an overexposed area in an image before the conventional lens-shading correction process is performed. The pixels of the overexposed area can be assigned with relatively low weights. A manner of assigning weight may be referred to FIG. 4A to 4C.

Figure 3:
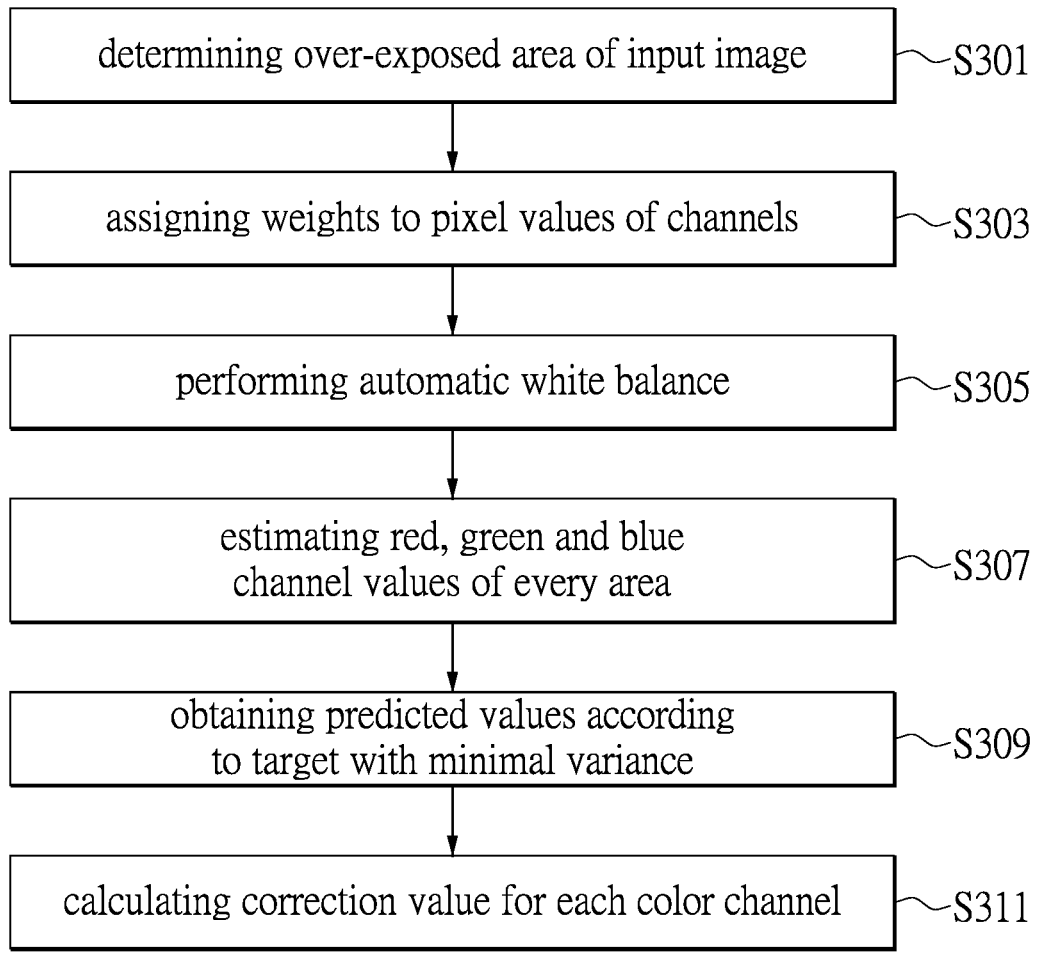
FIG. 3 is a flow chart depicting a method for image correction according to one embodiment of the disclosure.

FIG. 3 shows a flow chart describing a method for image correction in one embodiment of the disclosure. Firstly, such as in step S301, the method determines whether or not each of the pixels in an input image is part of the overexposed area before the image signals undergo the lens-shading correction process. In an exemplary example, a brightness threshold is introduced to compare with the pixel values of the pixels, and the pixels with the pixel values greater than the brightness threshold are determined as overexposed pixels. The threshold is determined based on practical needs, and therefore the overexposed area is only defined according to the requirements. Thus, at least one overexposed area can be obtained. Further, the low-frequency signals of the image can also be used to determine the overexposed area. The low-frequency signals of the image can be a reference to determine the overexposed area because the low-frequency signal of the image having more details can be used to determine the overexposed areas.

For processing the pixels of the overexposed area, the pixel in process is regarded as a current pixel. The pixel value of the current pixel in the overexposed area is configured as a first channel value (e.g., red, green or blue of a RGB color space) in a specific color space. Periphery pixels of the current pixel include other two channels that are configured to have a second channel value and a third channel value besides the first channel value. The second channel value and the third channel value of the periphery pixels are used to estimate or recover the other two channel values of the current pixel.

In step S303, every pixel in the overexposed area can be assigned with a specific weight according to its pixel value. With the RGB color space as an example, the values of the color channels, i.e., R channel, G channel and B channel, are assigned with respective weights. The weight can be numeral 0 to 1, and an interpolation method is used to obtain the weights for the color channels of the pixels. One of the objectives of this step is to retain the details of the overexposed area of the image for the use of a subsequent desaturation process; references are made to FIG. 4A to FIG. 4C.

Figure 4A:
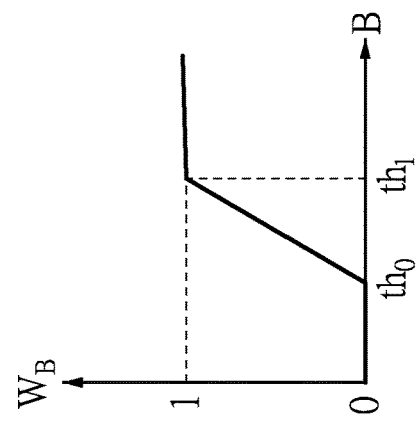
FIGS. 4A, 4B, and 4C are charts depicting weights assignment for the color channels in one embodiment of the disclosure.
Figure 4B:
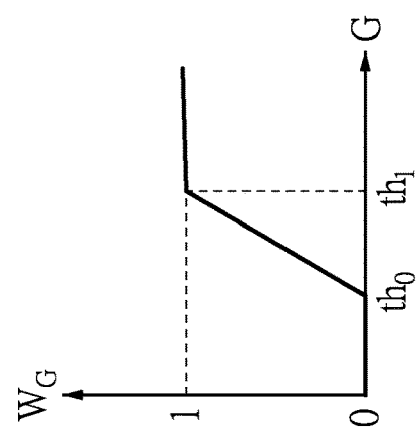
Figure 4C:
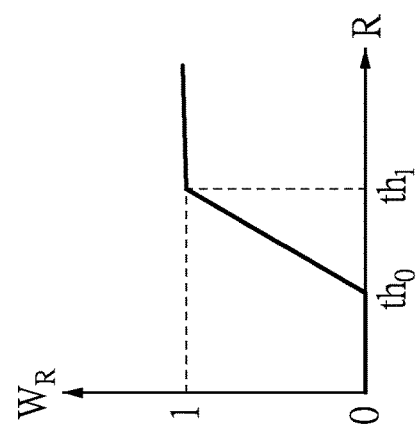

For example, each of the pixels of an input image is analyzed so as to determine if the pixels are part of the overexposed area. Firstly, the pixel value of the current pixel is obtained. If the pixel value is greater than the brightness threshold, the pixel is determined as overexposed and assigned with a higher weight; if the pixel value is no greater than the brightness threshold, the pixel is determined as non-overexposed. This aspect is to retain the original color details of the image. Reference is made to FIG. 4A to 4C that show graphic charts depicting weights assignment for the color channels in one embodiment of the disclosure. The processing parameters can be stored in a memory of the system according to one embodiment of the present disclosure.

FIG. 4A is a chart of the red channel weight ($W_R$) in one embodiment of the disclosure. The vertical axis denotes the red channel weight ($W_R$) and the horizontal axis denotes a red channel value (R). A first threshold (th0) and a second threshold (th1) are determined by the system so as to decide the weights corresponding to the red channel values. In the present example, the red channel weights are set as 0 or a minimum value when the red channel value is smaller than or equal to the first threshold (th0) that is configured to be a lower limit; the red channel weights are set as 1 when the red channel value is greater than or equal to the second threshold (th1) that is configured to be an upper limit; and the red channel weight can be obtained between 0 and 1 through an interpolation method when the red channel value is between the first threshold (th0) and the second threshold (th1). Similarly, FIG. 4B and FIG. 4C respectively show the graphic charts describing a green channel weight ($W_G$) and a blue channel weight ($W_B$) according to one embodiment of the disclosure.

In general, the weights assigned to the first channel value, the second channel value and the third channel value of every pixel are determined according to the channel value range between the above-mentioned upper limit (th0) and the lower limit (th1). The interpolation method is further incorporated to determine the weights. When the channel value of the pixel is no greater than the lower limit, the pixel is not treated by the overexposed image correction method since it is not overexposed.

Referring to step S305 of FIG. 3, after the positions of the one or a plurality of overexposed areas in the input image are confirmed, the pixel values of the pixels in the overexposed area are processed by gain control through an automatic white balance (AWB) process based on an expectation of low saturation in the overexposed area. The automatic white balance process automatically obtains gain parameters for adjusting a ratio of the color channels (R:G:B) with respect to each of the pixels according to a light property of the input image. In other words, the AWB process conducts gain control for the current pixel according to the ratio of the first channel value, the second channel value, and the third channel value.

Because of a user's subjective expectation that the human eyes sense lower saturation from the overexposed pixels, the image should be restored (step S307) after the automatic white balance process. For restoring the image, each of the pixels in the overexposed area are processed in a pixel-by-pixel manner (step S301), in which the second channel value and the third channel value of the current pixel can be estimated according to the second channel value and the third channel value of the periphery pixels of the current pixel. In an exemplary example, in an RGB color space, the red, green and blue channel values of each of the pixels within the overexposed area can be estimated in advance. The estimation can be implemented, but not limited to, by referring to color values or the low-frequency signals of the current pixel. Because each of the pixels of the image records one of the color values, i.e., the red, green and blue channel values, and all of channel values of each of the pixels have to be estimated for restoring the image, the channel values of the periphery pixels can be used to estimate the other two color values of the pixel.

For example, for a red pixel (i.e., the first channel value), green pixels located at two opposite sides of the red pixel can be used to estimate a green value (i.e., the second channel value) of the red pixel, and blue pixels located diagonally to the red pixel can be used to estimate a blue value (i.e., the third channel value) of the red pixel. The color value of one of the periphery pixels can be used as one of the color values of the red pixel, or alternatively, an average of the color values of the periphery pixels can also be used as one of the color values of the red pixel. More specifically, for a current pixel, an average of the second channel values of the periphery pixels can be used as the second channel value of the current pixel, and another average of the third channel values of the periphery pixels can be used as the third channel value of the current pixel. In one further embodiment, low-pass filter values of the periphery pixels are used to estimate the green and blue pixel values of the current red pixel.

It should be noted that, for minimizing a saturation of the pixels in the overexposed area, in the method, the saturation of the pixels can be minimized by increasing the channel value of the pixels in the overexposed area for minimizing the variance among the channel values (i.e., the R, G and B values). The method can effectively minimize the saturation for meeting the user's subjective expectation. The channel values of the pixels in the non-overexposed area are not adjusted since they are reliable data to be retained. After estimating the channel values of the pixels, in step S309, the channel values of the pixels in the overexposed area can be increased to a maximum for obtaining a plurality of predicted values while achieving the minimal variance. The prediction of the channel values is to minimize the variance among the red, green and blue channel values of the pixels in the overexposed area. The present example provides five predicted values. The following embodiment takes a first channel of a current pixel as an example. The example shows that the first channel is a red channel, the second channel is a green channel and the third channel is a blue channel, and there are five types of scenarios.

Type 1: the red channel is not overexposed, that is, not processed by the method for image correction. Type 2: the red channel is overexposed, the green channel is not overexposed, and the blue channel is not overexposed. Type 3: the red channel is overexposed, the green channel is overexposed, and the blue channel is not overexposed. Type 4: the red channel is overexposed, the green channel is not overexposed, and the blue channel is overexposed. Type 5: the red channel is overexposed, the green channel is overexposed, and the blue channel is overexposed. For minimizing the variance among the channel values, the following formulas are provided, in which 'R' denotes the estimated red channel value of the current pixel, 'G' denotes the estimated green channel value of the current pixel, and 'B' denotes the estimated blue channel value of the current pixel.

A general formula of variance E is:

$$E[(X-\mu)^2] = E[X^2] - E^2[X] = \frac{R^2 + G^2 + B^2}{3} - \left(\frac{R+G+B}{3}\right)^2;$$

when the values 'R', 'G', and 'B' are substituted into this formula, with the red channel value of the current pixel as an example, the red channel value is regarded as a calculation target when the green and blue channel values are given. In one embodiment of the disclosure, the channel values of the periphery pixels of the current pixel are used to estimate the green channel value as 'p' and the blue channel value as 'q' based on the expectation that the saturation of the overexposed pixel is lower. The variance formula is modified as:

$$\frac{R^2+p^2+q^2}{3}-\left(\frac{R+p+q}{3}\right)^2=\frac{2}{9}\left(R-\frac{(p+q)}{2}\right)^2+\frac{(p-q)^2}{6};$$

according to the above variance formula, the numeral 'R' should approach (p+q)/2 for obtaining the minimized variance. The variance is less when 'R' approaches '(p+q)/2.' On the premise that the variance should be minimized, the five predicted values '$v_{0xx}$', '$v_{100}$', '$v_{110}$', '$v_{101}$', and '$v_{111}$' with respect to the channel values of the pixels can be obtained. The predicted values are used to calculate correction values for each of the channels. The numerals '$v_{11x}$' and '$v_{10x}$' are used to calculate the overexposed value in the blue channel. The numeral '$v_{1xx}$' is used to calculate the overexposed value in the green channel. According to the present example, the numerals '$v_{0xx}$' and '$v_{1xx}$' are used to obtain the correction value for the red channel, the numerals '$v_{x0x}$' and '$v_{x1x}$' are used to obtain correction value for the green channel, and the numerals '$v_{xx0}$' and '$v_{xx1}$' are used to obtain the correction value for the blue channel.

Three subscripts of the above-mentioned five predicted values (v) respectively represent the overexposed states of red (R), green (G) and blue (B) channels in the RGB color space, in which the subscript '0' indicates a non-overexposed state, subscript '1' indicates an overexposed state, and subscript 'x' indicate an unknown state.

The red channel (R) is used as an example and depicted as follows.

Type 1: 'R' channel is non-overexposed. This type of pixel is not processed by the method for image correction. The predicted value is expressed by $v_{0xx}$=R.

Type 2: 'R' channel is overexposed, 'G' channel is non-overexposed, and 'B' channel is non-overexposed. The predicted value is expressed by (max: maximum): $v_{100}$=max{R, (G+B)/2}, in which the maximum of 'R' and '(G+B)/2' is used as the predicted value ($v_{100}$).

Type 3: 'R' channel is overexposed, 'G' channel is overexposed, and 'B' channel is non-overexposed. The predicted value can be expressed as $v_{110}$=B if the maximum of 'R' and 'G' is smaller than 'B' (If max(R, G)<B, $v_{110}$=B); otherwise, the predicted value $v_{110}$ is:

$v_{110}$=max{R,(max(R,G)+B)/2}.

Type 4: 'R' channel is overexposed, 'G' channel is non-overexposed, and 'B' channel is overexposed. The predicted value $v_{101}$=G if the maximum of 'R' and 'B' is smaller than 'G' (If max(R, B)<G, $v_{101}$=G); otherwise, the predicted value $v_{101}$ is:

$v_{101}$=max{R,(max(R,B)+G)/2}.

Type 5: 'R' channel is overexposed, 'G' channel is overexposed, and 'B' channel is also overexposed. The predicted value $v_{iii}$ equals to a maximum of 'R', 'G' and 'B' ($v_{111}$=max{R, G, B}).

The values of $v_{0xx}$, $v_{100}$, $v_{110}$, $v_{101}$ and $v_{111}$ are all 0 otherwise.

When the intermediate predicted values $v_{0xx}$, $v_{100}$, $v_{110}$, $v_{101}$ and $v_{111}$ used for calculating the correction value are obtained according to a target of minimalizing variance, in the step S311 of FIG. 3, a weighted average is applied to the probability of over exposure according to previously-estimated weights so as to calculate the correction value with respect to every channel value based on the probability of over exposure of each of the channels.

Figure 5:
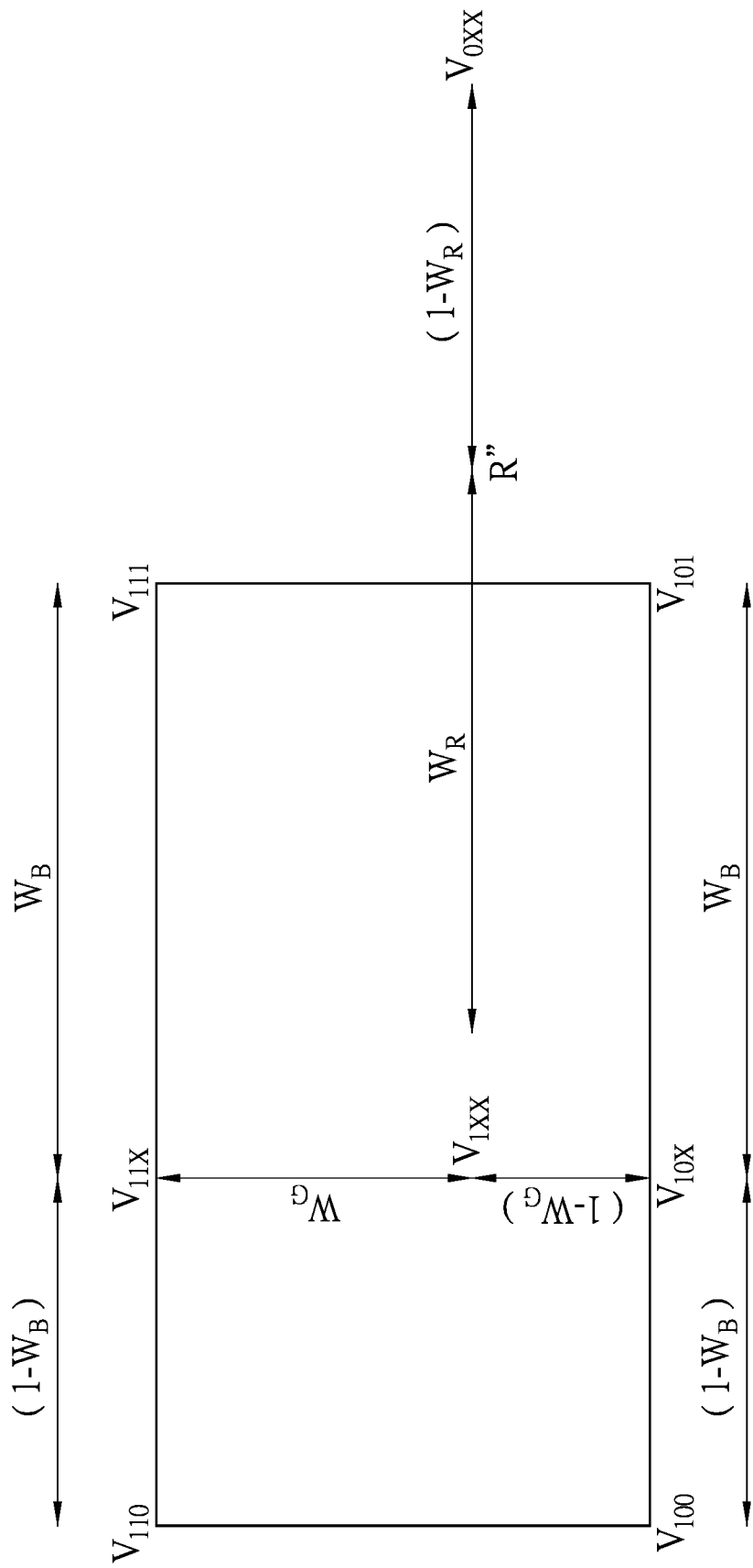
FIG. 5 shows a schematic diagram depicting probabilities of over exposure and a weighted average method according to one embodiment of disclosure.

An equation for performing weighted average method upon the probabilities of over exposure is as follows, in which $W_R$ denotes a red channel weight, $W_G$ denotes the green channel weight, and $W_B$ denotes a blue channel weight:

$R'=(1-w_R)\times v_{0xx}+w_R\times\{w_G\times\{(1-w_B)\times v_{110}+w_B\times v_{111}\}+(1-w_G)\times\{(1-w_B)\times v_{100}+w_B\times v_{101}\}\}$ FIG. 5 shows a graphic chart depicting probabilities of over exposure and weighted average method in one embodiment of the disclosure. FIG. 5 also provides a scheme to perform a weighted average method according to the probabilities of over exposure of pixels.

A rectangle is shown in the diagram. Four corners of the rectangle denote the numerals such as '$v_{110}$', '$v_{111}$', '$v_{100}$' and '$v_{101}$' an addition number '$v_{0xx}$.' The above-mentioned weights ($W_R$, $W_G$ and $W_B$) for the channels of the pixels are incorporated. The more weight is assigned to the channel if the channel value is higher, while the less weight is assigned to the channel if the channel value is lower. A weighted average method is performed upon the probabilities of over exposure of the color channels.

One end of upper edge of the rectangle denotes '$v_{110}$' that represents type 3: 'R' channel is overexposed, 'G' channel is overexposed, and 'B' channel is non-overexposed. The other end of the upper edge of the rectangle denotes '$v_{111}$' that represents type 5: 'R' channel is overexposed, 'G' channel is overexposed, and 'B' channel is also overexposed. With the above-mentioned blue channel weight ($W_B$), $v_{11x}=v_{110}*(1-W_B)+v_{111}*W_B$ is obtained.

One end of lower edge of the rectangle denotes '$v_{100}$' that represents type 2: 'R' channel is overexposed, 'G' channel is non-overexposed, and 'B' channel is non-overexposed. The other end of the lower edge of the rectangle denotes '$v_{101}$' that represents type 4: 'R' channel is overexposed, 'G' channel is non-overexposed, and 'B' channel is overexposed. With the blue channel weight ($W_B$), $v_{10x}=v_{100}*(1-W_B)+v_{101}*W_B$ is obtained.

When obtaining '$v_{11x}$' and '$v_{10x}$', such as a vertical line in the rectangle, the predicted value '$v_{1xx}$' can be calculated as $v_{1xx}=v_{11x}*W_G+v_{10x}*(1-W_G)$, wherein '$W_G$' is the green channel weight.

The present example takes the current pixel with the red channel value (R channel) as an example, the predicted value '$v_{1xx}$' with the overexposed R channel and the predicted value '$v_{0xx}$' with the non-overexposed R channel in the type 1 are calculated. The red channel weight ($W_R$) is used to obtain a correction value $R''=v_{1xx}*W_R+v_{0xx}*(1-W_R)$ for the red channel value. The correction value R" can verify the R' outputted by the formula performing the weighted average method upon the probabilities of over exposure.

Thus, in the same calculation, correction value G" for the green channel value can be obtained as: $G''=v_{x1x}*W_G+v_{x0x}*(1-W_G)$. Similarly, correction value B" of the blue channel value can be obtained as: $B''=v_{xx1}*W_B+v_0*(1-W_B)$.

In the method for processing the overexposed phenomena, in addition to using the conventional lens-shading correction method to solve the shading problem due to the uneven light refraction occurring in area near a center of the image or area away from the center of the image, an automatic white balance process is used to process the image for meeting the expectation of human eyes. Further, the method for image correction of the disclosure is able to reduce the saturation of the pixels in the overexposed area. The method can maintain the red, green and blue channel values close to an equal proportion (1:1:1) without color shift. The above embodiments of the present disclosure can minimize the variance among the color values and perform weighted average method upon the probability of over exposure of the pixels based on the estimated weights. Furthermore, the correction values with respect to the channel values of the pixels within the overexposed area can be calculated based on the requirement without color shift and according to the probability of over exposure in each of the color channels.

In conclusion, the method for image correction is performed only to the pixels in an overexposed area of the image. The method allows the red, green and blue channel values of the pixels in the overexposed area to be close to a ratio of 1:1:1, and to retain an original dynamic range of the image. Reliable information of the overexposed area can also be effectively retained. The details of the non-overexposed area can also be retained because the method does not process the pixels in the non-overexposed area. The method achieves advantages of the pixels in the overexposed area not having color shift, and a tone mapping process being effectively performed on the pixels. The method also achieves advantages of low cost and short processing time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for image correction, comprising:
   determining an overexposed area in an image, wherein each pixel of the image has a value in a 3-channel color space;
   assigning weights, one per channel, to each pixel in the overexposed area according to channel values of the pixel;
   performing an automatic white balance operation to the channel values of every pixel within the overexposed area based on an assumption that an image saturation of the overexposed area is low, and the automatic white balance operation relies on a light property of the image in automatically adjusting a gain of the current pixel according to ratios of the first channel value, the second channel value and the third channel value;
   after the automatic white balance operation, for each current pixel in the overexposed area:
      estimating a second channel value of the current pixel according to the second channel value of each of peripheral pixels of the current pixel and estimating a third channel value of the current pixel according to the third channel value of each of the peripheral pixels, wherein a selected channel of the current pixel is designated the first channel and the other two channels are designated the second channel and the third channel, respectively; and
      calculating a correction value of the first channel value of the current pixel according to the weights of the current pixel, wherein the correction value minimizes a variance among the first channel value, the second channel value and the third channel value of the current pixel.

2. The method according to claim 1, wherein a pixel is overexposed when a channel value of the pixel is greater than a brightness threshold.

3. The method according to claim 1, wherein the pixels with low-frequency signals are determined as the overexposed area.

4. The method according to claim 1, wherein the weight assigned to a channel value is determined by performing an interpolation according to the channel value and an upper limit and a lower limit for the values of said channel.

5. The method according to claim 4, wherein each of the first channel value, the second channel value and the third channel value of every pixel is a color value or a low-pass filter value of the pixel.

6. The method according to claim 4, wherein, when a channel value of a pixel is smaller than the lower limit for the channel, the pixel is a non-overexposed pixel and the image correction of claim 1 is not performed thereto.

7. The method according to claim 6, wherein each of the first channel value, the second channel value and the third channel value of every pixel is a color value or a low-pass filter value of the pixel.

8. The method according to claim 1, wherein the step of estimating the second channel value and the third channel value of the current pixel further includes: an average value of second channel values of a plurality of periphery pixels being used as the second channel value of the current pixel; and another average value of third channel values of the plurality of periphery pixels being used as the third channel value of the current pixel.

9. The method according to claim 8, wherein each of the first channel value, the second channel value and the third channel value of every pixel is a color value or a low-pass filter value of the pixel.

10. The method according to claim 1, wherein, in the step of calculating the correction value of the first channel value of the current pixel, the current pixel is configured to have five types based on a target with minimal variance among the first channel value, the second channel value and the third channel value, wherein the five types and the corresponding formulas are:
   type 1: $v_{0xx}=R$ when a first channel is not overexposed and not treated;
   type 2: $v_{100}=\max\{R, (G+B)/2\}$ when the first channel is overexposed, a second channel is non-overexposed and a third channel is not overexposed;
   type 3: the first channel is overexposed, the second channel is overexposed and the third channel is not overexposed, wherein:

If $\max(R,G)<B, v_{110}=B$;

else, $v_{110}=\max\{R,(\max(R,G)+B)/2\}$;

type 4: the first channel is overexposed, the second channel is not overexposed and the third channel is overexposed, wherein:

If $\max(R,B)<G, v_{101}=G$;

else, $v_{101}=\max\{R,(\max(R,B)+G)/2\}$;

and type 5: $v_{111}$=max{R, G, B} when the first channel is overexposed, the second channel is overexposed and the third channel is overexposed;

wherein the values of $v_{0xx}$, $v_{100}$, $v_{110}$, $v_{101}$ and $v_{111}$ are all 0 otherwise;

wherein 'R' denotes the first channel value of the current pixel, 'G' denotes the second channel value of the current pixel, and 'B' denotes the third channel value of the current pixel; $v_{0xx}$, $v_{100}$, $v_{110}$, $v_{101}$, $v_{111}$ are used to obtain an intermediate predicted value of the correction value of the first channel value, and the correction value is:

$$(1-w_R) \times v_{0xx} + w_R \times \{w_G \times \{(1-w_B) \times v_{110} + w_B \times v_{111}\} + (1-w_G) \times \{(1-w_B) \times v_{100} + w_B \times v_{101}\}\};$$

wherein $W_R$, $W_G$, and $W_B$ are the weights of the first channel value, the second channel value and the third channel value for the current pixel, respectively.

11. The method according to claim 10, wherein each of the first channel value, the second channel value and the third channel value of every pixel is a color value or a low-pass filter value of the pixel.

12. A system for image correction, comprising:
an image processor configured to receive and process an input image and generate an image for output; and
a memory configured to store image data to be processed and processing parameters;
wherein the image processor performs a method for overexposed image correction comprising:
determining an overexposed area in an image, wherein each pixel of the image has a value in a 3-channel color space;
assigning weights, one per channel, to each pixel in the overexposed area according to channel values of the pixel;
performing an automatic white balance operation to the channel values of every pixel within the overexposed area based on an assumption that an image saturation of the overexposed area is low, and the automatic white balance operation relies on a light property of the image to adjust a gain of the current pixel automatically according to ratios of the first channel value, the second channel value and the third channel value;
after the automatic white balance operation, for each current pixel in the overexposed area:
estimating a second channel value of the current pixel according to the second channel value of each of peripheral pixels of the current pixel and estimating a third channel value of the current pixel according to the third channel value of each of the peripheral pixels, wherein a selected channel of the current pixel is designated the first channel and the other two channels are designated the second channel and the third channel, respectively; and
calculating a correction value of the first channel value of the current pixel according to the weights of the current pixel, wherein the correction value minimizes a variance among the first channel value, the second channel value and the third channel value of the current pixel.

13. The system according to claim 12, wherein the image processor includes circuits or software programs for lens-shading correction, automatic white balance, and maintaining an image precision.

14. The system according to claim 12, wherein, in the method for overexposed image correction, a pixel is determined to be overexposed when a channel value of the pixel is greater than a brightness threshold or the pixel is determined to be overexposed based on low-frequency signals of the pixel.

15. The system according to claim 12, wherein, in the method for overexposed image correction, the weight assigned to a channel value is determined by performing an interpolation according to the channel value and an upper limit and a lower limit for the values of said channel;
wherein, when the channel value of the pixel is smaller than the lower limit, the pixel is a non-overexposed pixel and the image correction of claim 12 is not performed thereto.

16. The system according to claim 15, wherein, in the method for overexposed image correction, each of the first channel value, the second channel value and the third channel value of every pixel is a color value or a low-pass filter value of the pixel.

17. The system according to claim 12, wherein, in the method for overexposed image correction, the step for estimating the second channel value and the third channel value of the current pixel further includes: an average value of second channel values of a plurality of periphery pixels is used as the second channel value of the current pixel; and another average value of third channel values of the plurality of periphery pixels is used as the third channel value of the current pixel.

18. The system according to claim 17, wherein, in the method for overexposed image correction, each of the first channel value, the second channel value and the third channel value of every pixel is a color value or a low-pass filter value of the pixel.

19. The system according to claim 12, wherein, in the method for overexposed image correction, in the step of calculating the correction value of the first channel value and the current pixel, the current pixel has five types based on a target with minimal variance among the first channel value, the second channel value and the third channel value, wherein the five types and the corresponding formulas are as follows:

type 1: $v_{0xx}$=R when a first channel is not overexposed and not treated;

type 2: $v_{100}$=max{R, (G+B)/2} when the first channel is overexposed, a second channel is not overexposed and a third channel is not overexposed;

type 3: the first channel is overexposed, the second channel is overexposed and the third channel is not overexposed, wherein:

If $\max(R,G) < B, v_{110} = B$;

else, $v_{110} = \max\{R, (\max(R,G)+B)/2\}$;

type 4: the first channel is overexposed, the second channel is not overexposed and the third channel is overexposed, wherein:

If $\max(R,B) < G, v_{101} = G$;

else, $v_{101} = \max\{R, (\max(R,B)+G)/2\}$;

and type 5: $v_{111}$=max{R, G, B} when the first channel is overexposed, the second channel is overexposed and the third channel is overexposed;

wherein the values of $v_{0xx}$, $v_{100}$, $v_{110}$, $v_{101}$ and $v_{111}$ are all 0 otherwise;

wherein, 'R' denotes the first channel value of the current pixel, 'G' denotes the second channel value of the current pixel, and 'B' denotes the third channel value of the current pixel; $v_{0xx}$, $v_{100}$, $v_{110}$, $v_{101}$, $v_{111}$ are used to obtain an intermediate predicted value of the correction value of the first channel value, and the correction value is $$(1-w_R) \times v_{0xx} + w_R \times \{w_G \times \{(1-w_B) \times v_{110} + w_B \times v_{111}\} + (1-w_G) \times \{(1-w_B) \times v_{100} + w_B \times v_{101}\}\};$$

wherein $W_R$, $W_G$, and $W_B$ are the weights of the first channel value, the second channel value and the third channel value for the current pixel, respectively.

20. The system according to claim 19, wherein, in the method for overexposed image correction, each of the first channel value, the second channel value and the third channel value of every pixel is a color value or a low-pass filter value of the pixel.

* * * * *